(12) United States Patent
Jones et al.

(10) Patent No.: US 7,137,691 B2
(45) Date of Patent: Nov. 21, 2006

(54) MULTIPLE SEGMENT KEYING FOR SOLID INK STICK FEED

(75) Inventors: Brent R. Jones, Tualatin, OR (US); Timothy L. Crawford, Saint Paul, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/827,046

(22) Filed: Apr. 19, 2004

(65) Prior Publication Data

US 2004/0201657 A1    Oct. 14, 2004

Related U.S. Application Data

(62) Division of application No. 10/135,034, filed on Apr. 29, 2002, now Pat. No. 6,874,880.

(51) Int. Cl.
*B41J 2/175* (2006.01)
*G01D 11/00* (2006.01)

(52) U.S. Cl. .......................... 347/88; 347/99

(58) Field of Classification Search ............ 347/88, 347/99, 84, 85, 95
See application file for complete search history.

(56) References Cited

U.S. PATENT DOCUMENTS

| | | | |
|---|---|---|---|
| 5,223,860 A | 6/1993 | Loofbourow et al. ... | 346/140 R |
| 5,442,387 A | 8/1995 | Loofbourow et al. ......... | 347/88 |
| 5,455,604 A | 10/1995 | Adams et al. ............. | 346/138 |
| 5,510,821 A | 4/1996 | Jones et al. ............... | 347/88 |
| 5,734,402 A * | 3/1998 | Rousseau et al. ........... | 347/88 |
| 5,805,191 A | 9/1998 | Jones et al. .............. | 347/103 |
| 5,861,903 A | 1/1999 | Crawford et al. ........... | 347/88 |
| 5,917,528 A | 6/1999 | Grellmann et al. .......... | 347/88 |
| 5,988,805 A | 11/1999 | Meinhardt ................. | 347/88 |
| D478,347 S | 8/2003 | Jones | |
| D481,758 S | 11/2003 | Jones | |
| D482,062 S | 11/2003 | Jones | |
| D483,062 S | 12/2003 | Jones | |
| D494,620 S | 8/2004 | Levin et al. | |
| D495,734 S | 9/2004 | Levin et al. | |
| D495,735 S | 9/2004 | Levin et al. | |
| D497,176 S | 10/2004 | Levin et al. | |
| 2003/0202074 A1 | 10/2003 | Jones ........................ | 347/99 |
| 2003/0202078 A1 | 10/2003 | Jones et al. ................ | 347/99 |

OTHER PUBLICATIONS

Summary of Tektronix/Xerox Corporation Solid Ink Stick Products sold at least one year prior to Apr. 29, 2002.

* cited by examiner

*Primary Examiner*—Stephen Meier
*Assistant Examiner*—Leonard Liang
(74) *Attorney, Agent, or Firm*—David J. Arthur

(57) ABSTRACT

A solid ink feed system for a printer includes a longitudinal feed channel having a feed direction, and an insertion key plate having a key plate opening through it to provide access in an insertion direction into the feed channel. The insertion direction is different from the feed direction. The key plate opening has an insertion opening perimeter that includes two lateral opening perimeter segments and a transverse opening perimeter segment. The transverse opening perimeter segment intersects at least one of the lateral opening perimeter segments at an angle other than 180°. The insertion opening perimeter includes a first nonlinear key element on one lateral perimeter segment, a second nonlinear key element on a second lateral perimeter segment, and a third nonlinear key element on the transverse perimeter segment. An ink stick for the solid ink feed system includes an ink stick body having a perimeter shape that substantially matches the insertion opening perimeter.

16 Claims, 16 Drawing Sheets

MULTIPLE SEGMENT KEYING FOR SOLID INK STICK FEED

This application is a divisional application of U.S. application Ser. No. 10/135,034, filed Apr. 29, 2002, now U.S. Pat. No. 6,874,880 by Brent R. Jones, and entitled "Solid Ink Stick with Identifiable Shape," the contents of which are hereby incorporated herein by reference.

CROSS-REFERENCE TO RELATED APPLICATIONS

Reference is made to commonly-assigned copending U.S. patent application Ser. No. 10/135,156 filed concurrently herewith, entitled "Feed Guidance and Identification for Ink Stick," by Jones et al., U.S. patent application Ser. No. 10/135,105 filed concurrently herewith, entitled "Multiple Port Jones, and U.S. patent application Ser. No. 10/135,067 filed concurrently herewith, entitled "Visible Identification of Solid Ink Stick," by Jones et al., the disclosures of which are incorporated herein." Reference is made to commonly assigned U.S. patent application Ser. No. 10/135,089, filed Apr. 29, 2002 by Brent R. Jones et al., and entitled "Alignment Feature for Solid Ink Stick," and to abandoned U.S. patent application Ser. No. 10/135,085, filed Apr. 29, 2002, entitled "Multiple Segment Keying for Solid Ink Stick Feed," by Jones et al.

The present invention relates generally to ink printers, the ink used in such ink printers, and the apparatus and method for feeding the ink into the printer.

BACKGROUND

Solid ink or phase change ink printers conventionally receive ink in a solid form and convert the ink to a liquid form for jetting onto a receiving medium. The printer receives the solid ink either as pellets or as ink sticks in a feed channel. With solid ink sticks, the solid ink sticks are either gravity fed or spring loaded through the feed channel toward a heater plate. The heater plate melts the solid ink into its liquid form. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

An ink stick for use in a solid ink feed system of a phase change ink jet printer includes an ink stick body having a first perimeter shape in which the first perimeter shape comprises at least first, second, and third perimeter segments. The first and second perimeter segments intersect one another at a first corner, forming a first intersecting angle of other than 180°. The second and third perimeter segments intersect one another at a second corner, forming a second intersecting angle of other than 180°. The first perimeter segment includes a first non-linear key element, the second perimeter segment includes a second non-linear key element, and the third perimeter segment includes a third non-linear key element, none of which non-linear key elements encompass the first or second corners.

An ink stick for use in a solid ink feed system of a phase change ink jet printer, in which the ink feed system includes a feed channel having a feed direction and an insertion opening permitting insertion of an ink stick in an insertion direction, different from the feed direction, into the feed channel, the ink stick including an ink stick body having an ink stick insertion perimeter in a plane substantially perpendicular to the insertion direction. The ink stick insertion perimeter includes at least three nonlinear key elements, a first of which is along a first portion of the ink stick insertion perimeter that is substantially perpendicular to the feed direction, and a second of which is along a portion of the ink stick insertion perimeter that is substantially perpendicular to the feed direction. The first and second nonlinear key elements do not intersect one another.

An ink stick is for use in a solid ink feed system of a phase change ink jet printer that has a feed channel with a longitudinal feed direction, and a transverse direction. The ink stick includes an ink stick body that has an outer perimeter with at least one lateral perimeter segment and at least one other perimeter segment. The ink stick body is adapted to travel through the feed channel with the lateral perimeter segment of the ink stick substantially parallel the longitudinal feed direction of the feed channel. The other perimeter segment is oriented at least partially in the transverse direction of the feed channel.

A solid ink feed system for a printer includes a longitudinal feed channel having an insertion end and a feed direction and an insertion key plate having a key plate opening through it to provide access in an insertion direction to the feed channel. The insertion direction is different from the feed direction, the key plate opening has an insertion opening perimeter, and the insertion opening perimeter includes two lateral opening perimeter segments and a transverse opening perimeter segment. The transverse opening perimeter segment intersects at least one of the lateral opening perimeter segments at an angle other than 180°. The insertion opening perimeter includes a first nonlinear key element on a first one of the lateral perimeter segments of the ink stick insertion perimeter, a second nonlinear key element on a second one of the lateral perimeter segments of the ink stick insertion perimeter, and a third nonlinear key element on the transverse perimeter segment of the ink stick insertion perimeter. An ink stick for the solid ink feed system includes an ink stick body having a perimeter shape with two lateral perimeter segments and a transverse perimeter segment. First and second nonlinear key elements on the lateral perimeter segments correspond in shape and size to the first and second nonlinear key elements of the insertion opening perimeter. A third nonlinear key element on the transverse perimeter segment corresponds in shape and size to the third nonlinear key element of the insertion opening perimeter.

A method of feeding solid ink sticks in a feed direction through first and second feed channels of solid ink feed systems of phase change ink jet printers includes providing first and second solid ink sticks, each of which has a perimeter. The first ink stick is aligned with a first insertion opening of a first feed channel with a section of the perimeter of the first ink stick aligned with a matching shaped section of the first insertion opening. The second ink stick is aligned with a second insertion opening of a second feed channel with a section of the perimeter of the second ink stick aligned with a matching shaped section of the second insertion opening. The shaped sections of the first and second insertion openings are different. The shaped sections of the first and second insertion openings are at least partially transverse to the feed direction of their respective feed channels.

THE DRAWINGS

DETAILED DESCRIPTION

Figure 1:
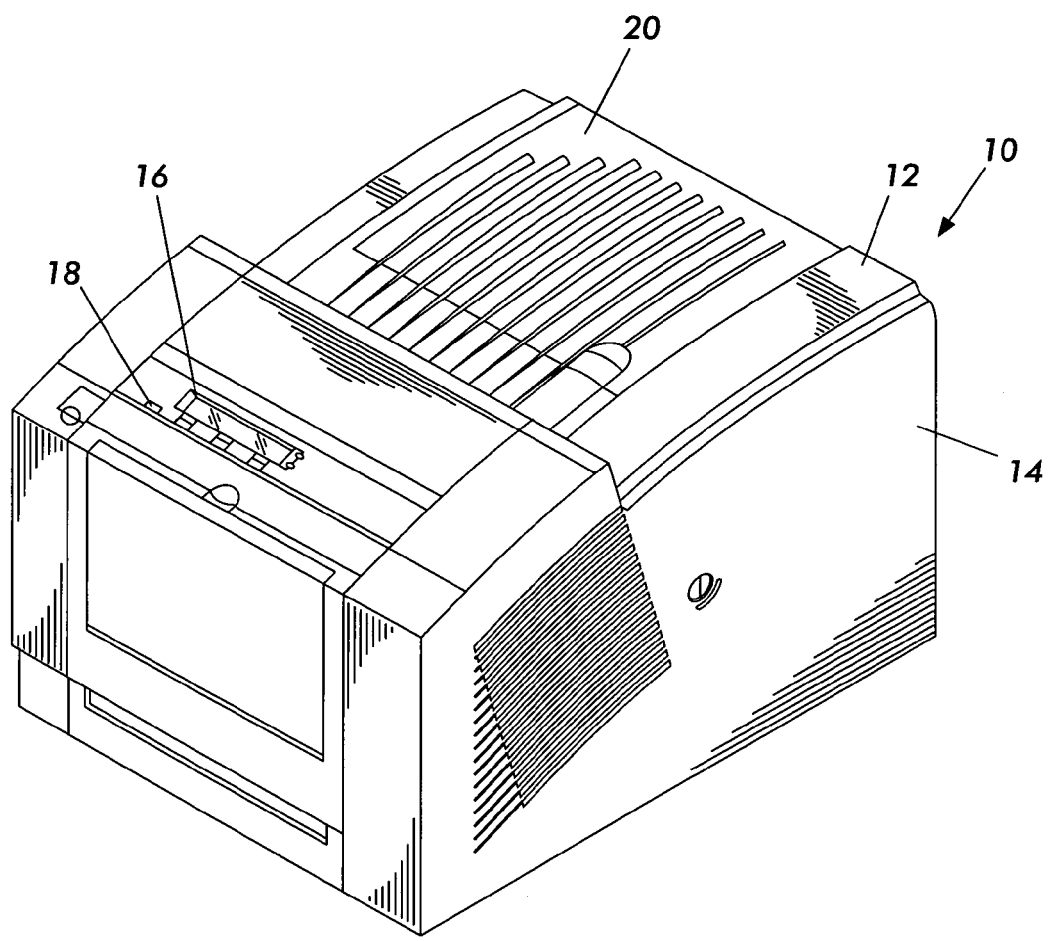
FIG. 1 is a perspective view of a phase change printer with the printer top cover closed.
Figure 2:
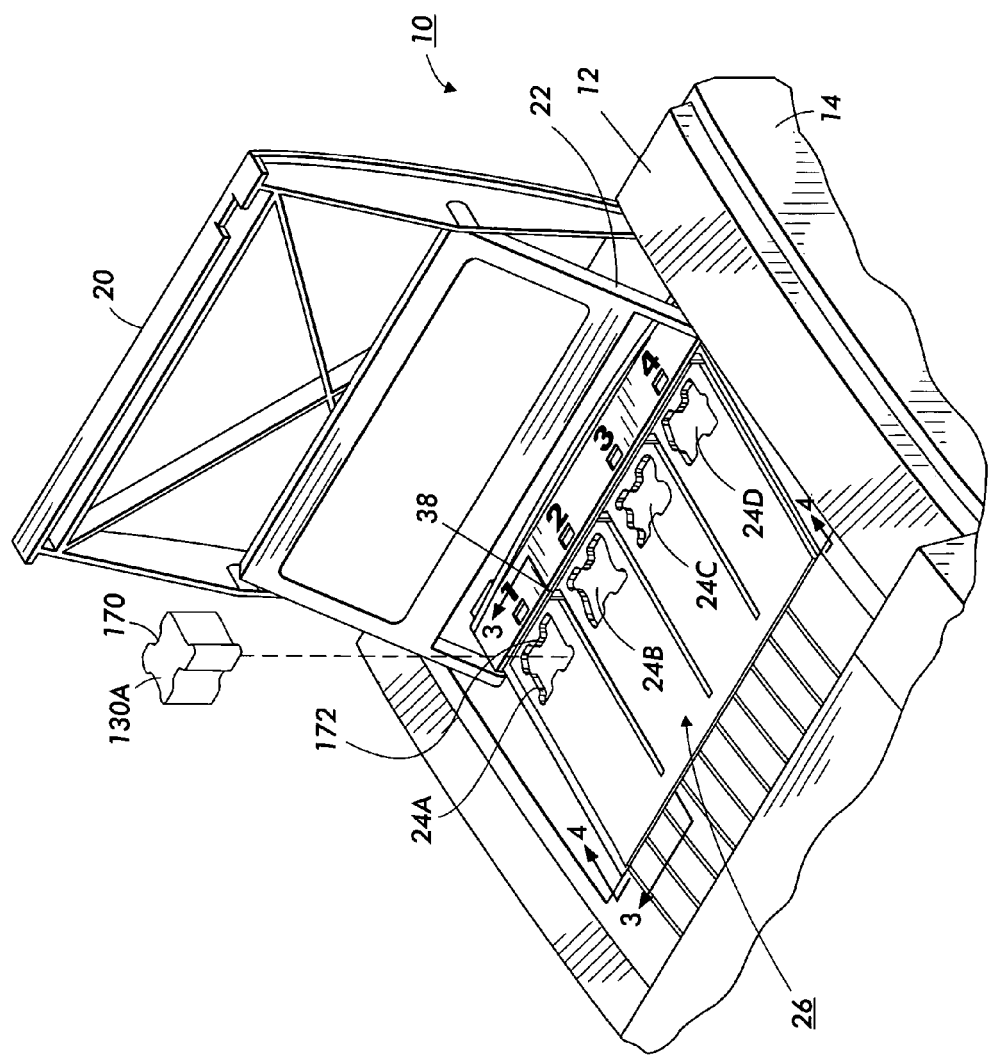
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the operator access to the ink feed system.

Figure 3:
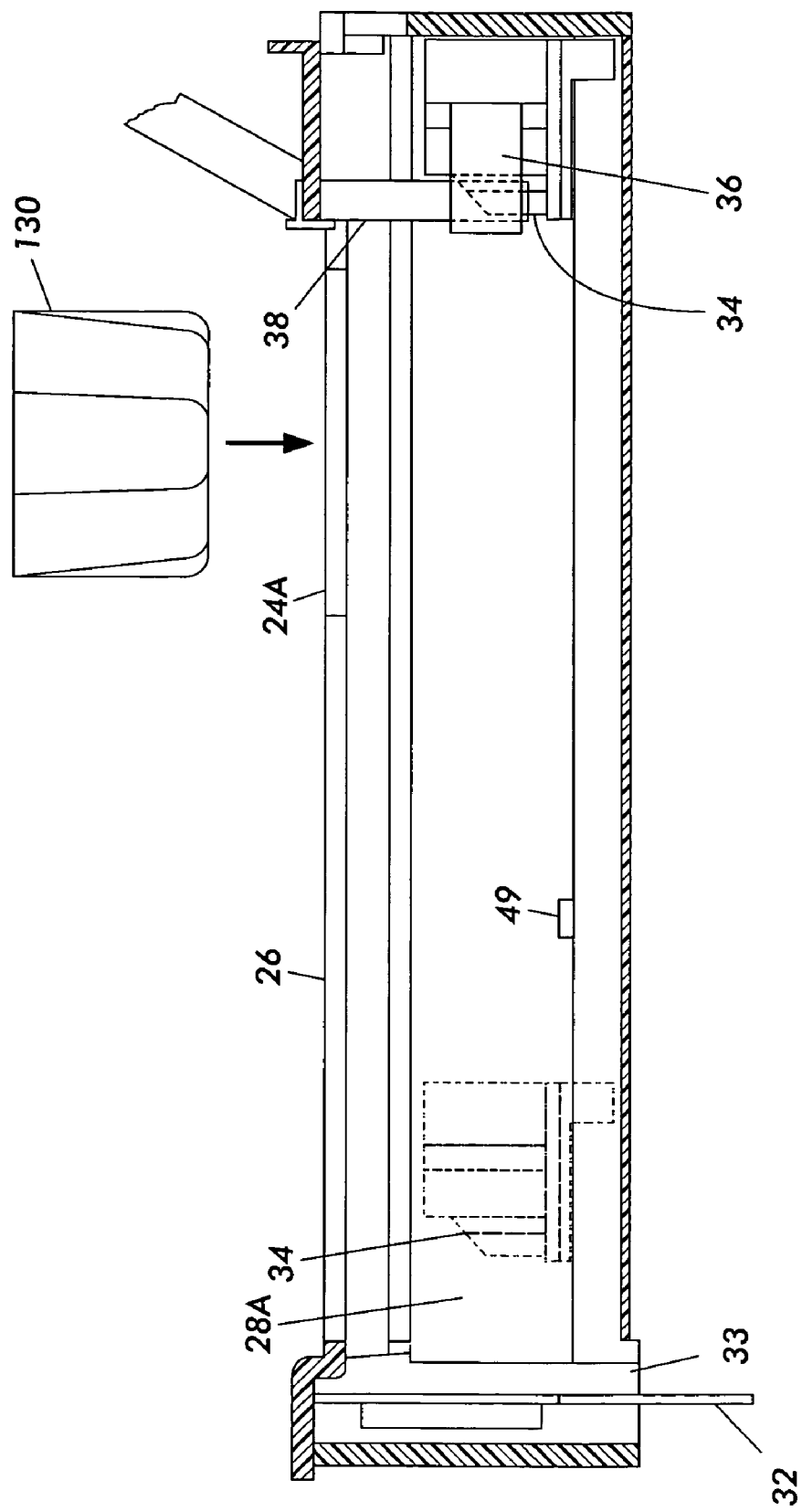
FIG. 3 is a side sectional view of a feed channel of the solid ink feed system, taken along line 3—3 of FIG. 2.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A, 24B, 24C, 24D. Each keyed opening 24A, 24B, 24C, 24D provides access to an insertion end of one of several individual feed channels 28A, 28B, 28C, 28D of the solid ink feed system (see FIGS. 2 and 3).

Figure 4:
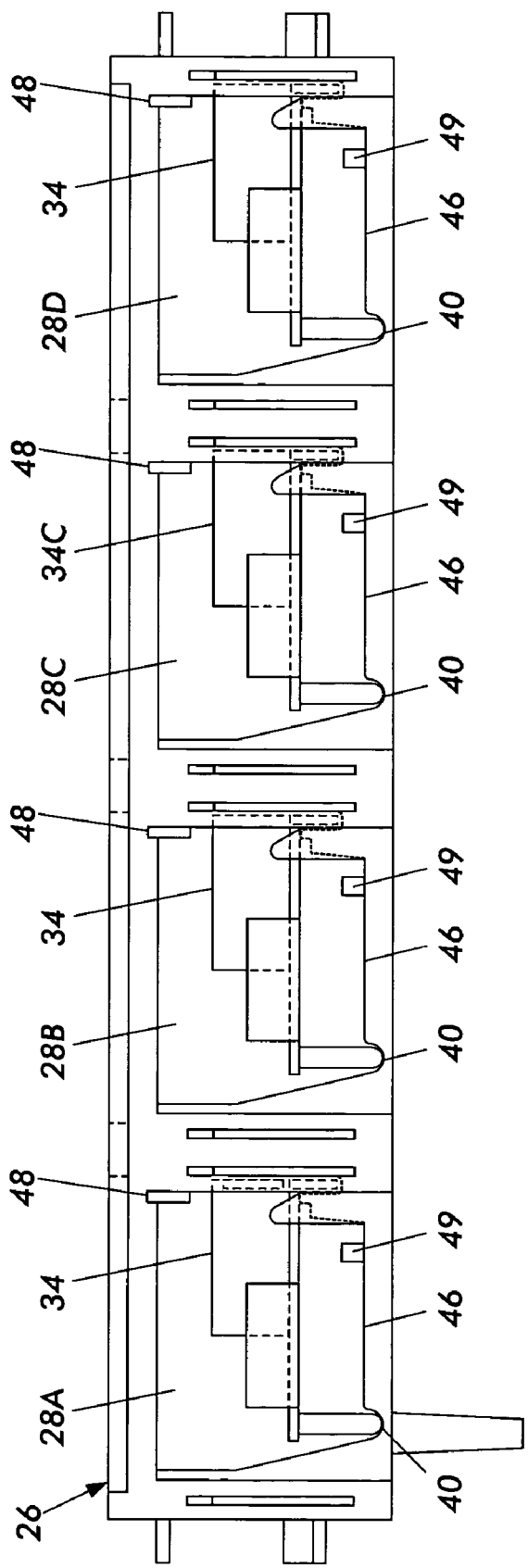
FIG. 4 is a sectional view of the ink stick feed system, taken along line 4—4 of FIG. 2.

Each longitudinal feed channel 28A, 28B, 28C, 28D delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28 have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. In a manner similar to that described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26. The constant force spring 36 can be a flat spring with its face oriented along a substantially vertical axis. FIG. 4 is a cross-sectional view of an exemplary feed chute comprising a set of feed channels 28A, 28B, 28C, 28D.

A color printer typically uses four colors of ink (yellow, cyan, magenta, and black). Ink sticks 130 of each color are delivered through a corresponding individual one of the feed channels 28A, 28B, 28C, 28D. The operator of the printer exercises care to avoid inserting ink sticks of one color into a feed channel for a different color. Ink sticks may be so saturated with color dye that it may be difficult for a printer operator to tell by the apparent color alone of the ink sticks which color is which. Cyan, magenta, and black ink sticks in particular can be difficult to distinguish visually based on color appearance. The key plate 26 has keyed openings 24A, 24B, 24C, 24D to aid the printer operator in ensuring that only ink sticks of the proper color are inserted into each feed channel. Each keyed opening 24A, 24B, 24C, 24D of the key plate has a unique shape. The ink sticks 130 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 5:
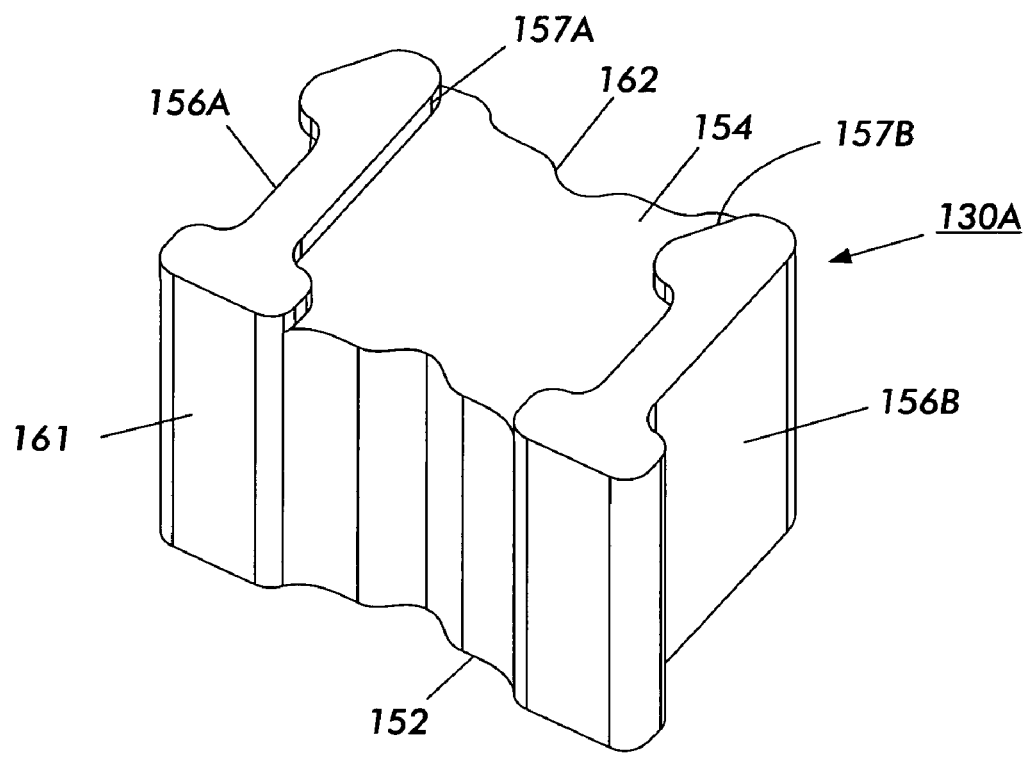
FIG. 5 is a perspective view of an embodiment of a solid ink stick.

An exemplary solid ink stick 130 for use in the feed system is illustrated in FIG. 5. The ink stick is formed of a three dimensional ink stick body. The surfaces of the ink stick body need not be flat, nor need they be parallel or perpendicular one another. However, these descriptions will aid the reader in visualizing, even though the surfaces may have three dimensional topography, or be angled with respect to one another. The ink stick body illustrated has a bottom exemplified by a generally bottom surface 152 and a top exemplified by a generally top surface 154. The particular bottom surface 152 and top surface 154 illustrated are substantially parallel one another, although they can take on other contours and relative relationships. The ink stick body also has a plurality of side extremities, such as side surfaces 156A, 156B, 161, 162. The illustrated embodiment includes four side surfaces, including two end surfaces 161, 162 and two lateral side surfaces 156A, 156B. The basic elements of the lateral side surfaces 156A are substantially parallel one another, and are substantially perpendicular to the top and bottom surfaces 152, 154. The end surfaces 161, 162 are also basically substantially parallel one another, and substantially perpendicular to the top and bottom surfaces, and to the lateral side surfaces. One of the end surfaces 161 is a leading end surface, and the other end surface 162 is a trailing end surface. The basic side surfaces 156 and the end surfaces 161, 162 are modified with key and other shaping elements, as described in greater detail below. The ink stick body may be formed by pour molding, injection molding, compression molding, or other known techniques.

The ink stick shown in FIG. 5 has a substantially horizontal perimeter shape, as when the ink stick is viewed from above the top surface, corresponding to the shape of the keyed opening 24A–D of the corresponding feed channel for that particular color (see FIG. 2). The horizontal cross-sectional shape of each color ink stick for a particular printer is different. The combination of the keyed openings 24A–D in the key plate 26 and the keyed shapes of the ink sticks 130 insure that only ink sticks of the proper color are inserted into each feed channel. A set of ink sticks is formed of an ink stick of each color, with a unique shape for ink sticks of each color.

Figure 7:
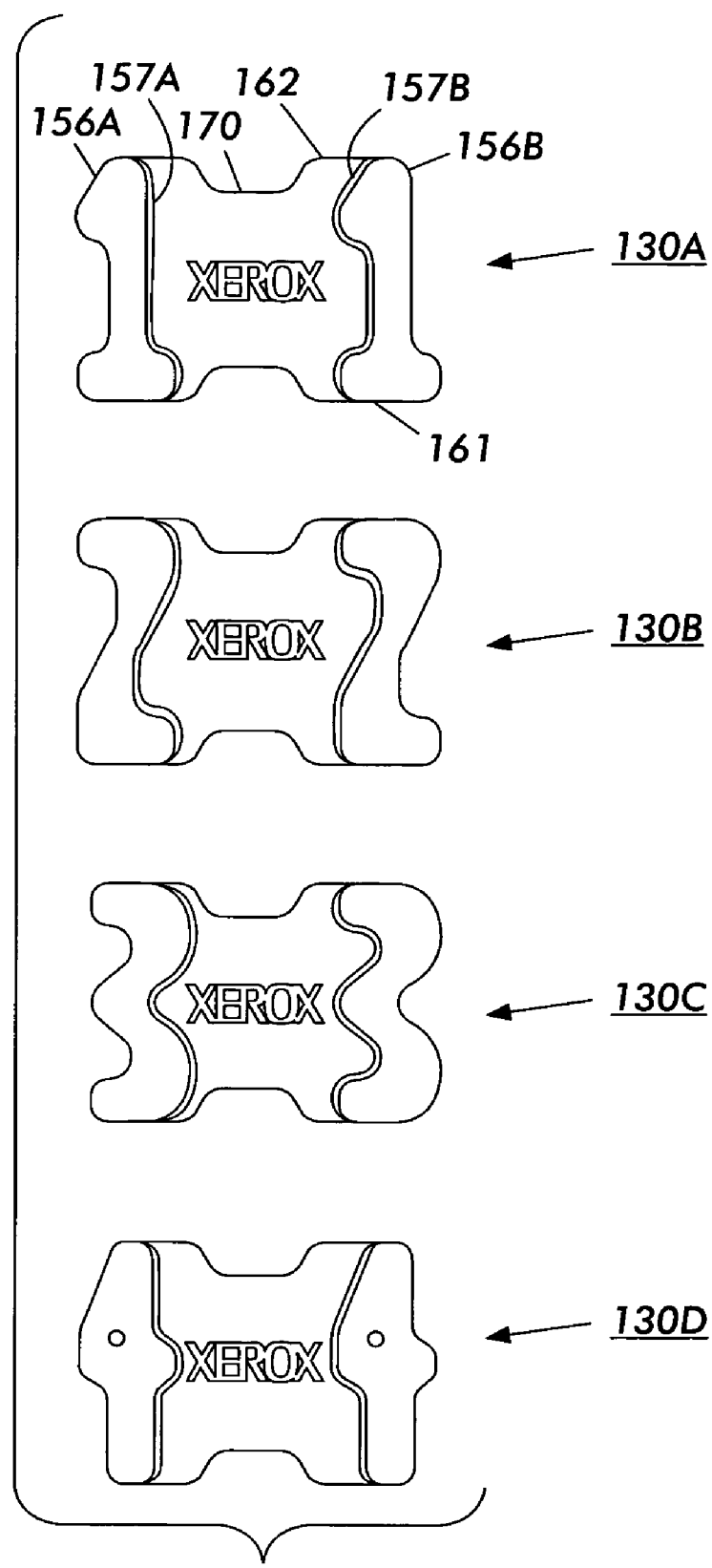
FIG. 7 is a top elevational view of a set of solid ink sticks.

FIG. 5 shows an example of an ink stick 130 in which the horizontal perimeter shape of the ink stick forms a visually recognizable shape that identifies the ink stick with a particular feed channel is formed in the horizontal outer perimeter of the ink stick body. FIG. 7 shows an exemplary set of such ink sticks. In the ink stick set shown in FIG. 7, the substantially horizontal outer perimeter of each ink stick of the set forms a shape of a visually recognizable symbol, such as an alphanumeric character. The visually recognizable symbol is a shape that provides the printer operator with meaning that the operator can then use to associate the ink stick with a particular keyed opening or feed channel. The printer operator can correlate a visually recognizable symbol with a particular feed channel more easily than correlating a keyed shape that does not convey symbolic significance. In the particular set of ink sticks shown, the outer perimeter of the ink stick body has lateral perimeter segments corresponding to the lateral side surfaces 156 of the ink stick body. The left lateral perimeter segment (formed by the left lateral side surface 156A, as viewed from above the ink stick) forms the left side of the visually recognizable symbol, and the right lateral perimeter segment (formed by the right lateral side surface 156B) forms the right side of the visually recognizable symbol. When the ink stick is inserted into the feed channel, the lateral side surfaces (and lateral perimeter segments) are substantially aligned (parallel) with the longitudinal (long) dimension of the feed channel.

Figure 6:
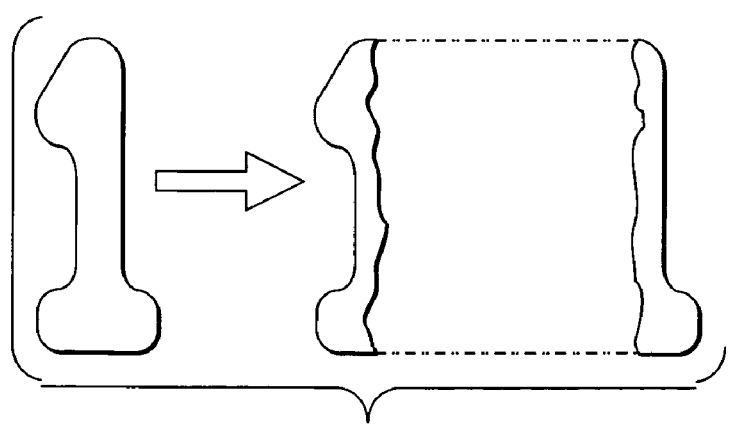
FIG. 6 is a stylized representation of the derivation of an ink stick shape.

The exemplary ink stick 130A of FIG. 5 has a perimeter shape in the form of the numeral "1." FIG. 6 illustrates how the lateral perimeter segments of the ink stick body form the visually recognizable symbol. The lateral perimeter segments of the ink stick body are connected to one another by end perimeter segments formed by the end surfaces 161, 162 of the ink stick body. For ink stick bodies having substantially vertical lateral side surfaces, the lateral perimeter segments are formed by contoured lateral side surfaces of the ink stick bodies. In that circumstance, the perimeter of the top surface 154 of the ink stick body has the shape of the ink stick outer perimeter shape. The side surfaces of the ink stick body can also be sloped, segmented, or stepped so that one portion of the ink stick body is narrower than another portion. For example, the lateral side surfaces 156 can be stepped so that the upper portions of the lateral side surfaces are farther apart from one another than are the lower portions of the lateral side surfaces. In that circumstance, the perimeter of the top surface still has the shape of the outer horizontal perimeter, though the bottom surface does not. Other configurations are possible in which the side surfaces of the ink stick body are shaped so that the outer perimeter of the ink stick body is at a different elevation along the vertical height of the ink stick body. In yet another alternative, different segments of the outer perimeter can be at different elevations along the vertical height of the ink stick body.

The shaped lateral side surfaces provide an ink channel insertion keying mechanism, as seen in FIG. 2. In such an implementation, the lateral edges of each keyed opening 24A, 24B, 24C, 24D through the key plate 26 are correspondingly shaped so that the keyed opening admits an ink stick body having the requisite lateral perimeter segment shapes, while excluding ink stick bodies having other lateral perimeter segment shapes. The printer operator can easily associate an ink stick having a particular feed channel of the printer, either by correlating the symbol of the ink stick with the corresponding keyed opening 24A, 24B, 24C, 24D in the key plate, or by correlating the symbol of the ink stick with the corresponding symbol that can be displayed adjacent the keyed opening. Thus, the visually recognizable symbol formed by the lateral perimeter segments of the ink stick body provide an ink channel key that performs a color keying function for the printer by excluding from a particular channel of the printer ink sticks that are of the incorrect color.

In the ink stick sets shown in FIG. 7, the visually recognizable shapes that identify the correct key plate opening 24A, 24B, 24C, 24D, and thus the correct ink stick feed channel, are provided in both lateral side surfaces of the ink stick body. One side surface 156A of the ink stick body is shaped with one side edge of the visually recognizable character, and the other lateral side surface 156B of the ink stick body is shaped with the other side edge of the visually recognizable character. To enhance the visual recognition of the character, the substantially horizontal top surface 154 of the ink stick body can further be embossed or debossed with additional edges 157 of the visually recognizable shape. For example, as seen in the illustrated sets of ink sticks, the left and right lateral side surfaces 156A, 156B of the ink stick bodies are shaped to provide the left and right edges of the visually recognizable characters, respectively. In addition, the right edge of the visually recognizable shape is formed as an edge 157A in the substantially horizontal top surface of the ink stick body substantially adjacent the left lateral side surface of the ink stick body. This embossed edge provides an enhanced visual recognition for the shape. Similarly, the left edge of the visually recognizable shape is formed as an embossed edge 157B in the top surface of the body, substantially adjacent to the right lateral side edge of the top surface. In an alternative, a replica of the entire symbol or character can be embossed or debossed in the top surface of the ink stick body.

Figure 8:
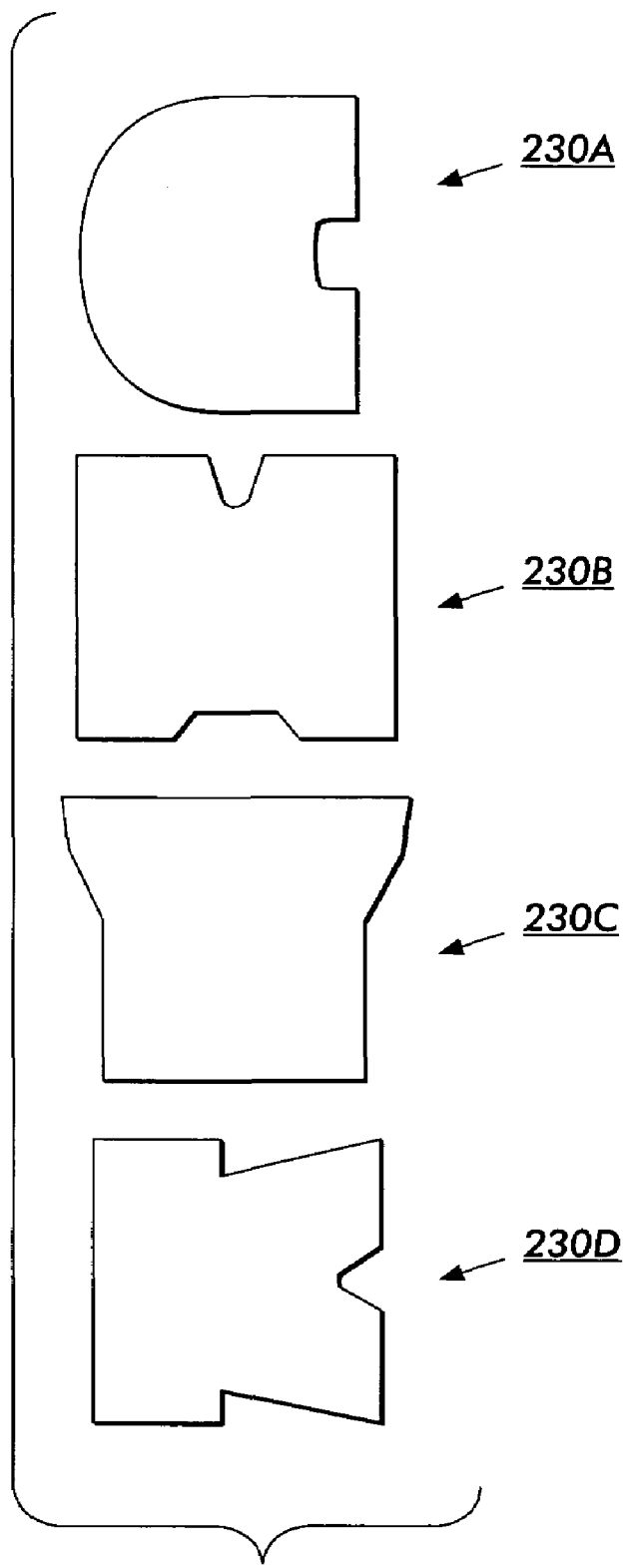
FIG. 8 is a top elevational view of another set of solid ink sticks.

The individual insertion feed channel keying function can be provided with shapes that provide visually recognizable symbols other than numeric characters. For example, referring to FIG. 8, ink sticks 230A, 230B, 230C, 230D have perimeter segments that from visually recognizable alphabetical characters. In the particular set shown, the alphabetical characters are "C," "Y," "M," and "K," which printer operators will associate with the colors of the ink—C for cyan, Y for yellow, M for magenta, and K for black. Such alphabetical characters are easy for the printer operator to associate with the proper feed channel for each color of ink.

Figure 9:
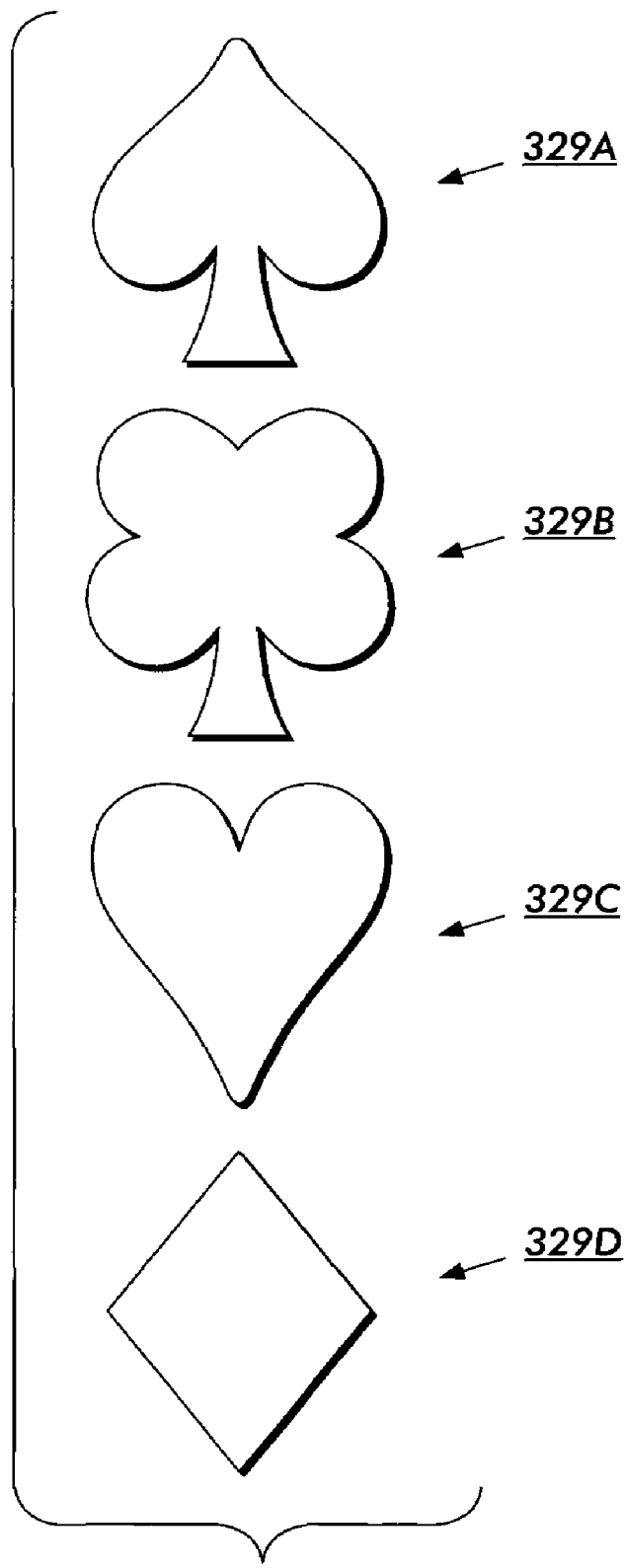
FIG. 9 is a view of a set of symbols for use in another set of solid ink sticks.
Figure 10:
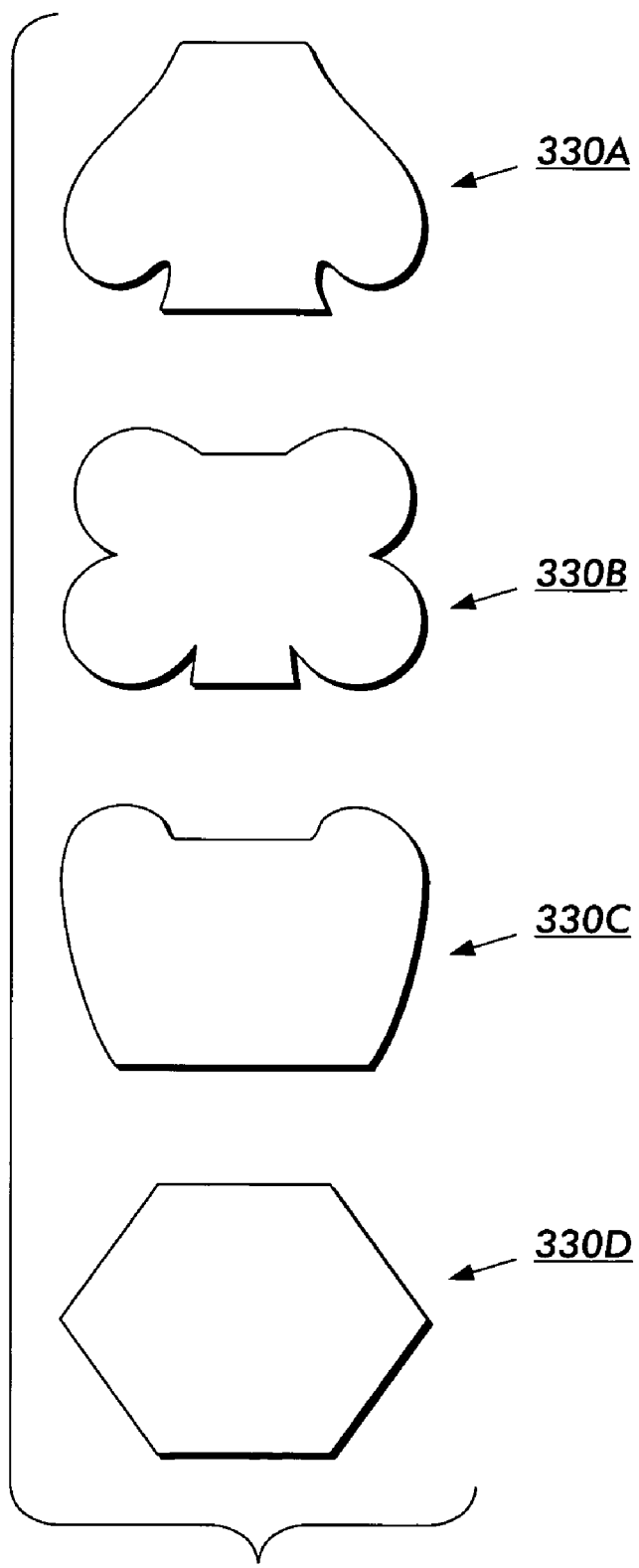
FIG. 10 is a top elevational view of a set of solid ink sticks incorporating the symbols of FIG. 9.

The ink stick perimeter can be formed into visually identifiable symbols other than alphanumeric characters. FIGS. 9 and 10 illustrate that a set of symbols 329A, 329B, 329C, 329D from common playing cards can form the basis for a set of ink stick shapes for a set of ink sticks 330A, 330B, 330C, 330D. With the present teaching, those skilled in the art will recognize that other symbols can also be used, such as the shapes of animals or other recognizable objects.

Figure 11:
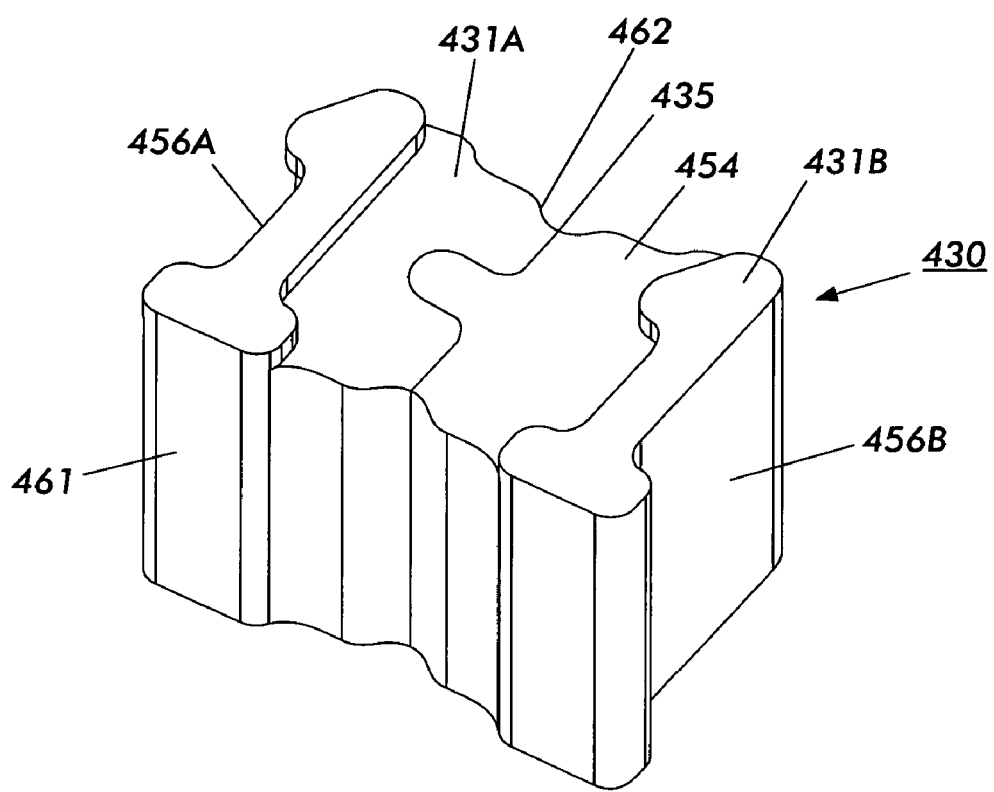
FIG. 11 is a perspective view of another embodiment of a solid ink stick.

In some instances, it may be beneficial to mold the ink stick in multiple sections or portions, which portions can be assembled prior to inserting the ink stick into the feed channel. Such multiple portion ink sticks may be beneficial, for example, if the size of the ink stick is such that the ink stick body does not solidify consistently during the forming process. Referring to FIG. 11, an ink stick 430 is formed of two portions 431A, 431B that fit together at a joining line 435. The joining line of the illustrated embodiment intersects the leading and trailing end surfaces 461, 462 of the ink stick body, dividing the ink stick into lateral portions. Each ink stick portion 431A, 431B has a substantially horizontal perimeter (as viewed from above the ink stick portion). The perimeter of each ink stick portion includes a section of the visually recognizable symbol formed by the shape of the ink stick. In the illustrated embodiment, a section of the perimeter of the left ink stick portion 431A includes a perimeter segment forming the left section of the numeral "1." A section of the right ink stick portion 431B includes a perimeter segment forming the right portion of the numeral "1." The perimeter of each ink stick portion 431A, 431B also includes a joint perimeter segment. The joint perimeter segment of the first ink stick portion 431A is the complement of the joint perimeter segment of the second ink stick portion 431B. Thus, when the first and second ink stick portions are brought adjacent one another, the joint perimeter segments can abut one another and form the joining line 435. When the two ink stick sections 431A, 431B are joined together, the complete ink stick has a perimeter that forms the visually recognizable symbol, the numeral "1."

The illustrated joining line 435 has a "puzzle cut" shape that provides a protrusion from one section of the ink stick that fits into a recess in the other section. The interaction of such a protrusion and recess helps to hold the two sections of the ink stick together as the printer operator inserts the assembled ink stick through the key plate opening 24 into the feed channel. The illustrated sections of the ink stick are substantially equal in size. However, other embodiments can have ink stick sections that are dissimilar in size. In addition, the ink stick can include more than two sections.

The joining line can alternatively extend top to bottom, diagonally across the ink stick body, or laterally across the ink stick body, so that the joining line intersects the lateral sides 456A, 456B of the ink stick body and divides the ink stick into longitudinal sections. Depending on the configuration of the ink stick shape forming the visually recognizable symbol, one or more sections of the ink stick body has a perimeter section that includes at least a portion of the shape of the visually recognizable symbol.

Referring now to FIGS. 7 and 12–15, an additional perimeter segment of each ink stick is used to provide an additional insertion keying function. In the illustrated ink stick sets, the additional insertion keying function is a printer keying function that associates a set of ink sticks with a particular printer. The printer keying function is provided by providing a contour to at least a portion of the perimeter of the ink stick (when viewed from above). A common key element is included throughout a set of ink sticks intended for a particular printer model that permits those ink sticks to be inserted into the feed channels of that printer, but prevent those ink sticks from being inserted into an incorrect printer. FIG. 7 shows a set of ink sticks 130A, 130B, 130C, 130D that has the additional keying function provided by a key element 170 in one or more of the transverse side (end) segments 161, 162 of the outer perimeter of the ink stick body. In a substantially cubic ink stick body in which the outer perimeter coincides with the substantially vertical side surfaces of the ink stick body, the key element(s) 170 are indentations formed in the transverse end surface(s) that are substantially perpendicular to the lateral side surfaces. These transverse side surfaces may be the leading and trailing end surfaces of the ink stick body, and are at least partially transverse to the longitudinal direction of the feed channel when the ink stick is placed in the feed channel. This additional keying function can be used to protect particular ink printers from receiving ink sticks intended for a different printer model. Each ink stick of the set of ink sticks shown in FIG. 7 includes a key element of the same shape in the transverse side of the ink stick. Referring to the printer with its key plate shown in FIG. 2, a corresponding complementary key 172 is included in the perimeter of each keyed opening 124 for that particular printer model. The particular key 172 shown in the key plate of the printer of FIG. 2 corresponds to the key element 170 on the set of ink sticks shown in FIG. 7. In lieu of forming the key 172 in the perimeter of the key plate, most remote from the melt plate the key can be formed in the face of the push block 34 that presses against the trailing end surface of the ink stick body.

The first keying function, which in the illustrated example is performed by key elements on the lateral side segments 156 of the outer perimeter of the ink stick and corresponding lateral side edges of the keyed openings 124, ensures that only ink sticks of the appropriate color are fed into each feed channel of the printer. The second keying function, which in the illustrated implementation is performed by key elements 170 in the transverse sides 162, 162 of the ink sticks and the corresponding transverse edges of the keyed openings 124, ensures that the ink sticks of all colors for a particular printer can be inserted only into that printer. This prevents contamination of the printer that might occur if ink sticks having an ink formulation intended for one printer are inserted into the ink stick feed channels of a printer intended and designed to operate with a different type of ink stick, such as having a different ink formulation. Comparing FIGS. 7 and 2, the printer feed system shown in FIG. 2 is designed to admit the ink sticks of the ink stick set shown in FIG. 7. Thus, the first ink stick 130A of the set shown in FIG. 7 fits through the first keyed opening 124A of the feed system shown in FIG. 2, while the second ink stick 130B of the set shown in FIG. 7 fits through the second keyed opening 124B, and so forth.

Figure 12:
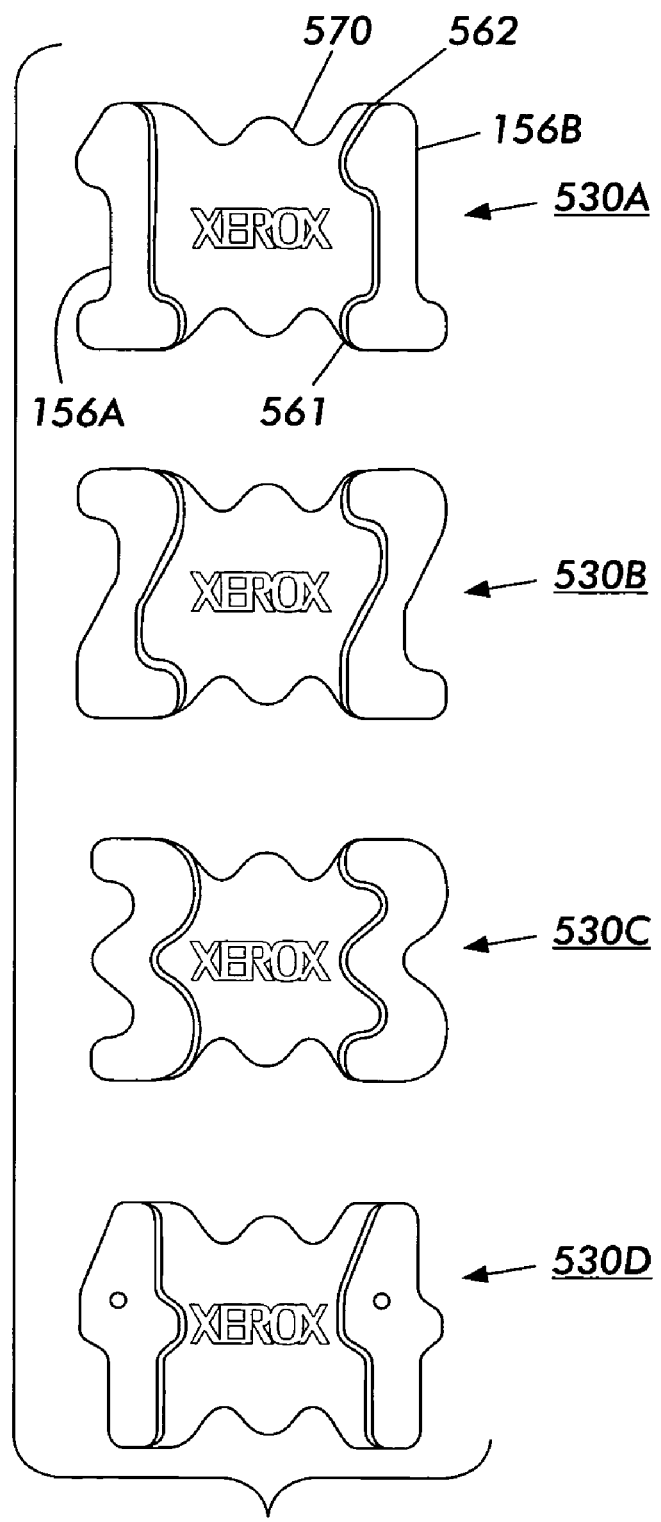
FIG. 12 is a top elevational view of another set of solid ink sticks.
Figure 13:
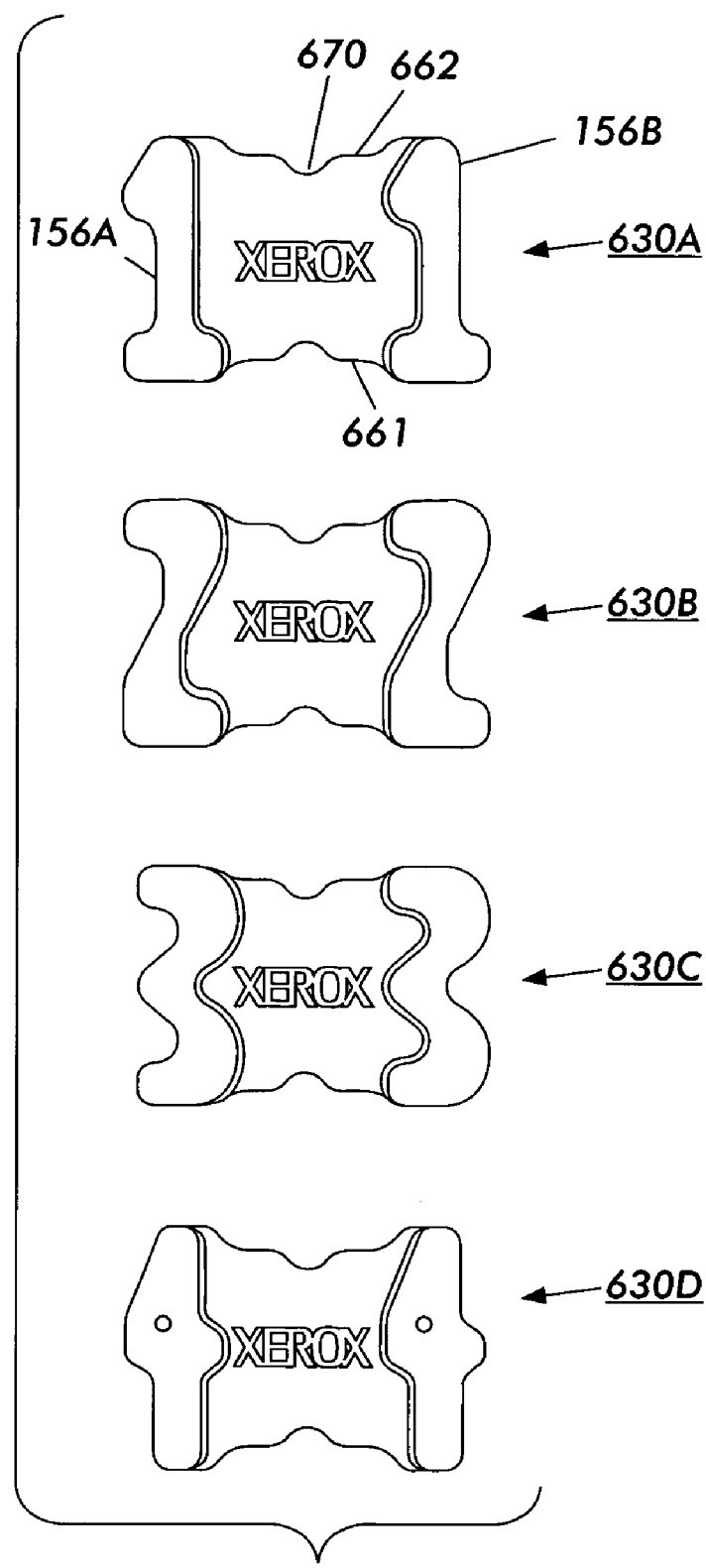
FIG. 13 is a top elevational view of another set of solid ink sticks.
Figure 14:
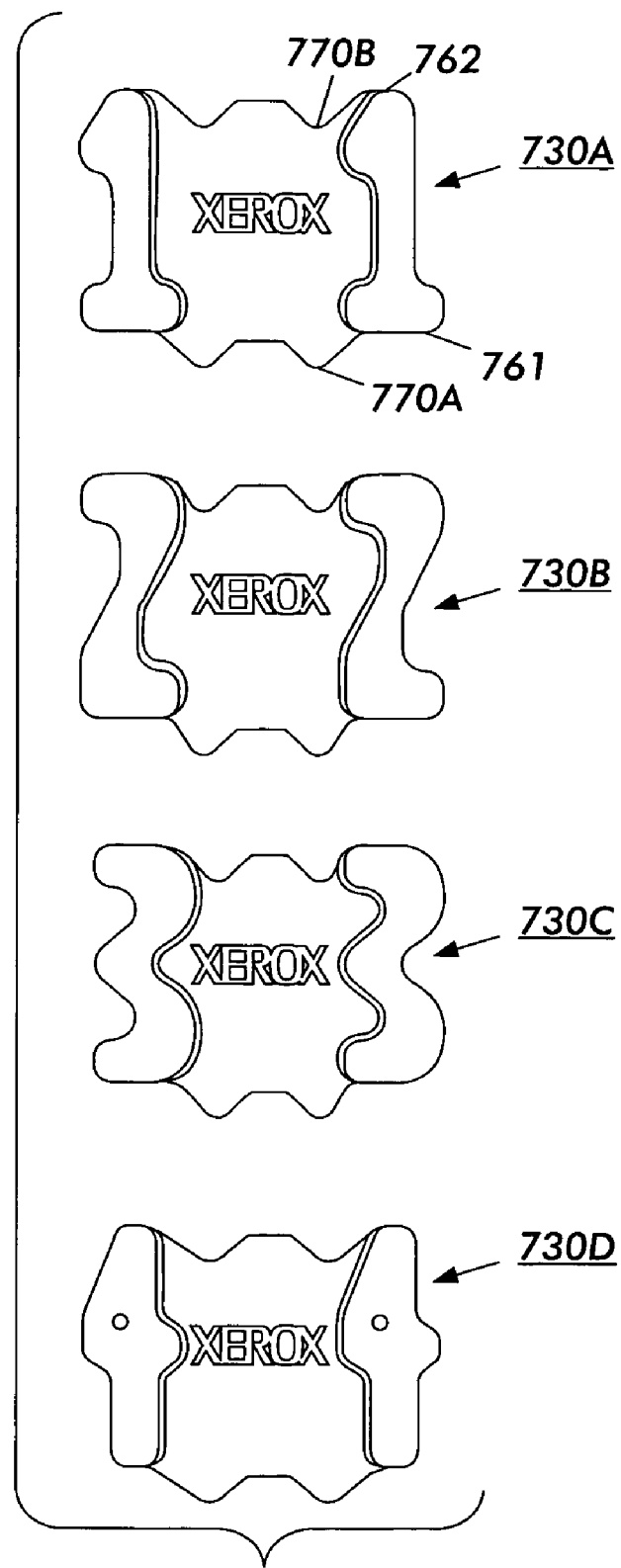
FIG. 14 is a top elevational view of another set of solid ink sticks.
Figure 15:
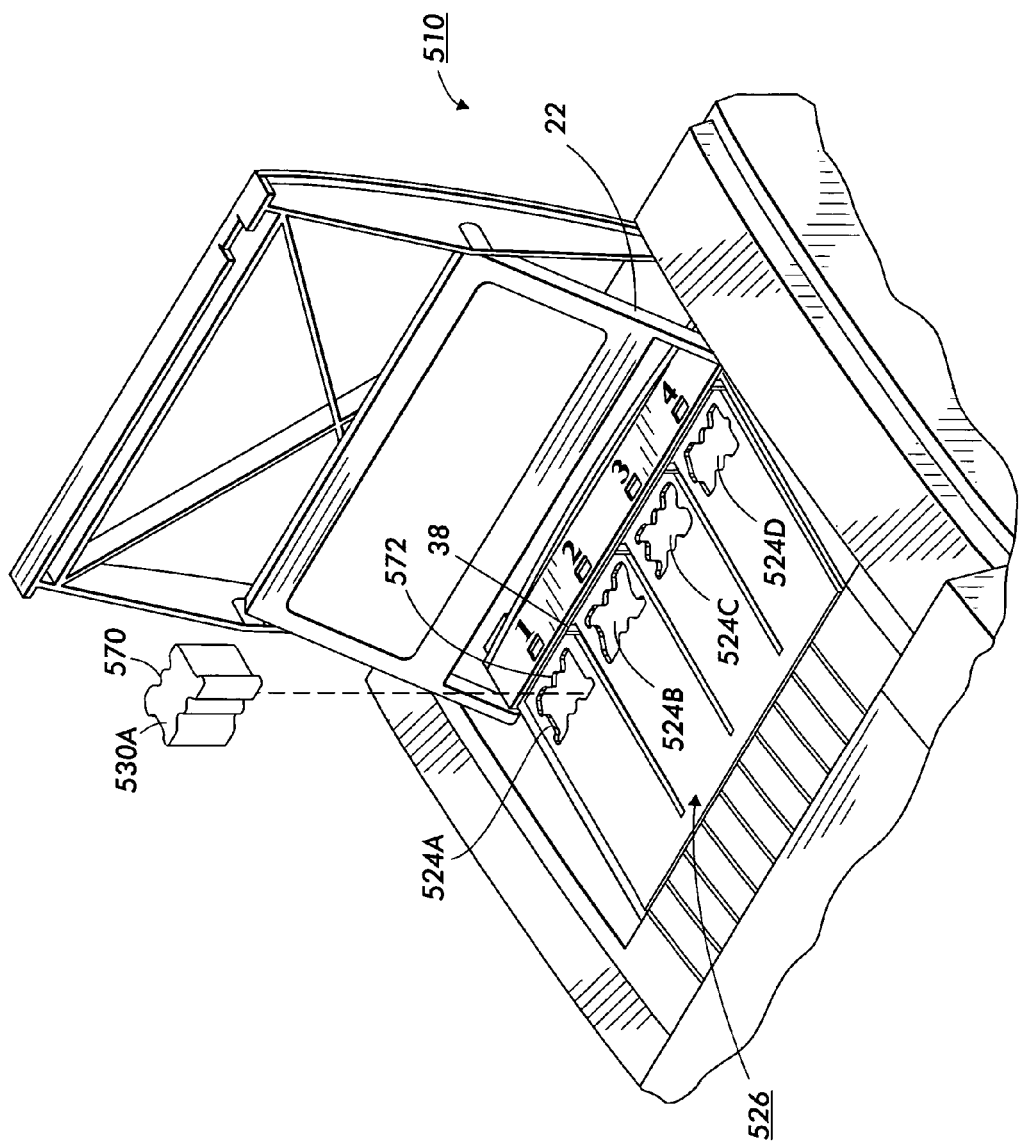
FIG. 15 is an enlarged partial top perspective view of another embodiment of a phase change printer with the printer cover and the ink access cover open, showing a solid ink stick in position to be loaded into a feed channel.

Different printers sometimes require different types of ink. Therefore, this additional keying function provides a mechanism to block ink intended for one printer from being inserted into an incompatible printer. This printer exclusion keying function is provided by using different shapes for the common keys 172 in the keyed openings 124 of the key plates 126 of different printers. The keys 172 along the traverse edges of each keyed opening of the feed system shown in FIG. 2 exclude ink sticks having different shapes of key elements in their transverse sides. FIGS. 12–14 show sets of ink sticks in which the transverse sides of each ink stick has a common key element shape, but which differ between ink stick sets. FIG. 12 shows a set of ink sticks 530A, 530B, 530C, 530D in which the transverse side surfaces 561, 562 of each ink stick of the set has a common key element 570. The set of ink sticks 530A, 530B, 530C, 530D fit into the printer 510 shown in FIG. 15. That printer has a key plate 526 that has keyed openings 524A, 24B, 24C, 24D with a common key 572 in each opening. The key 572 has a shape complementary to the shape of the key element 570 of each ink stick 530A, 530B, 530C, 530D. The common key element 570 of the ink stick set of FIG. 12 (and the corresponding key 572 of the printer of FIG. 15) is different from the common key element 170 of the ink stick set of FIG. 7 (and the corresponding key 172 of the printer of FIG. 2). The different keys 172, 572 and corresponding key elements 170, 570 prevent a printer operator from accidentally inserting an ink stick of the set of FIG. 7 into the printer of FIG. 15, and also prevents the printer operator from accidentally inserting an ink stick of the set of FIG. 12 into the printer of FIG. 2.

FIG. 13 illustrates a set of ink sticks 630A, 630B, 630C, 630D, having yet a different common key element 670 in the transverse sides of each ink stick of the set. This set of ink sticks is used with yet a different printer with a corresponding common key in the keyed insertion openings through the key plate.

Although the common key element for a set of ink sticks is illustrated using two opposed sides of the ink stick transverse to the feed channel direction, those skilled in the art will recognize that the common key element for a set of ink sticks can be configured in different positions. For example, the common key element can be formed in one side only of the ink stick, or in adjacent sides of the ink stick body, or in the lateral sides of the ink stick body.

FIG. 14 illustrates a set of ink sticks 730A, 730B, 730C, 730D that has complementary contours for the leading and trailing end surfaces 761, 762 to provide complementary shapes for the key elements 770A, 770B on the leading and trailing end surfaces. In the example shown, the non-planar contour of one end surface 761 forms a projecting key element 770A. The non-planar contour of the opposite end surface 762 forms a recessed key element 770B. The complementary shapes 770A, 770B nest with one another when two ink sticks are placed adjacent one another with the trailing end surface of one ink stick abutting the leading end surface of the next ink stick in the ink channel. This interaction of the contoured end surfaces of the adjacent ink sticks limits the movement of one ink stick with respect to the other. So limiting the relative movement of the ink sticks insures that the ink sticks do not become skewed with respect to each other or with respect to the feed channel as they travel along the length of the feed channel.

Of course, after reading the above description, those skilled in the art will recognize that key elements for performing the first (color) and second (printer) keying functions can be included in any combination of perimeter segments of the ink stick body. For example, the color key function can be provided by key elements in the transverse perimeter segments, while the printer key function can be provided by key elements in the lateral side perimeter segments. In addition, the ink stick body may have a horizontal perimeter shape other than rectangular, so that the key elements are formed in perimeter segments that are not necessarily parallel with the longitudinal direction of the feed channel, nor necessarily completely transverse to the longitudinal direction of the feed channel. Furthermore, the color keying and printer keying elements can be included separately or together.

The above description will also make clear to those skilled in the art that feed channel insertion key elements can be included on multiple sides of the ink stick body. In addition to key elements on the lateral sides of the ink stick body, key elements can be included on sides that are at least in part transverse to the longitudinal feed direction of the feed channel (are not parallel to the lateral sides of the ink stick). These transverse sides are either straight or curved, and can be perpendicular to the lateral sides, or be at some other angle. Thus, additional perimeter segments are available to include key elements, so that a greater variety of key shapes can be used.

Figure 16:
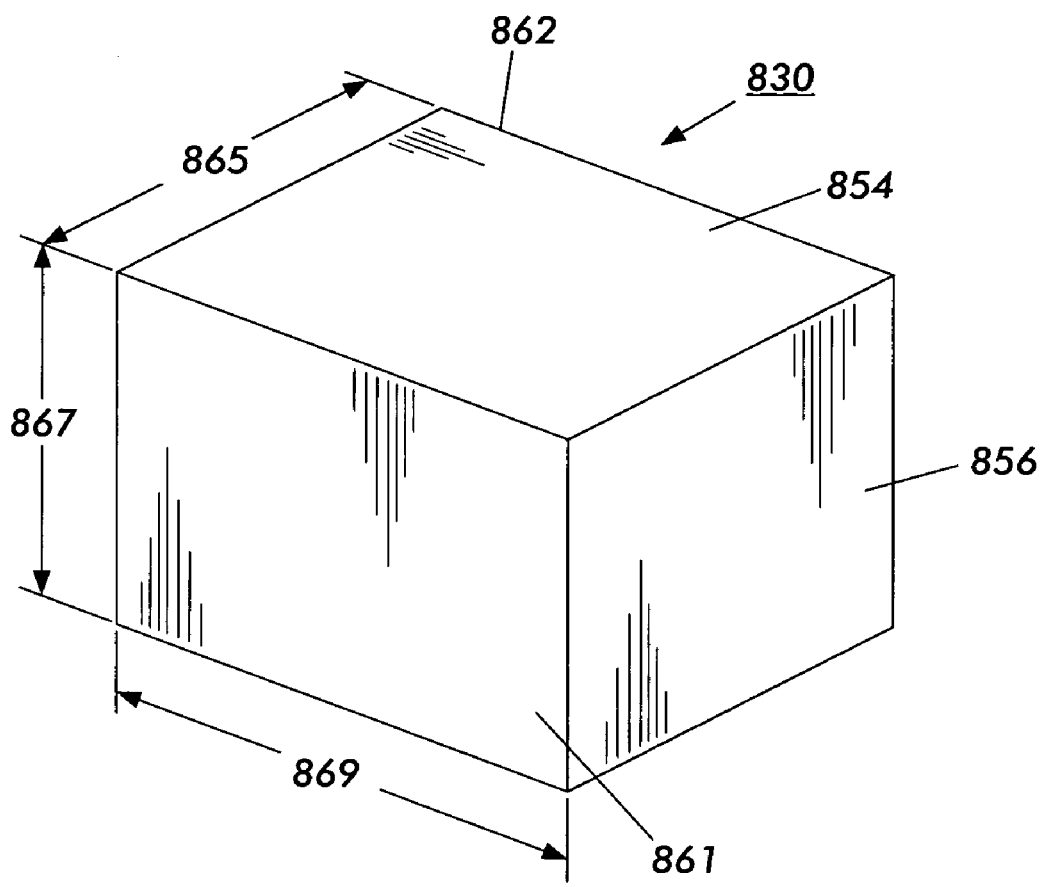
FIG. 16 is a perspective view of a simplified ink stick body.

A highly simplified ink stick 830 is shown in FIG. 16. The ink stick 830 represents the envelope of the ink sticks illustrated in FIGS. 5–14, including contours, indentations, and protrusions for keying and alignment functions. The body of the ink stick has an aspect ratio in which the width 869 of the ink stick body between the lateral side surfaces 856 is approximately equal to or greater than the longitudinal length 865 of the ink stick body. The longitudinal length 865 of the ink stick body between the end surfaces 861, 862 is the dimension that is along (aligned with) a longitudinal feed channel, such as the feed channel 28A, 24B, 24C, 24D of the ink jet printer 10 of FIG. 2, when the ink stick is properly inserted into the feed channel. The width 869 of the ink stick body is the dimension perpendicular to the length. The ratio of the width 869 of the ink stick body to the length 865 is between 1.0 and 1.5. In the particular embodiment shown in FIG. 16, the ratio of width to length is approximately 1.25. In one exemplary embodiment, the length 865 of the ink stick body 830 is approximately 1.2 inches (30 mm), and the width 869 is approximately 1.5 inches (38 mm). The height can be significantly greater or less than either the length or the width.

This aspect ratio arrangement provides the printer operator improved flexibility in stocking ink in the feed channels. Each feed channel 28A, 24B, 24C, 24D has sufficient length to hold at least two ink sticks. As the leading ink stick adjacent the melt plate 32 (FIG. 3) in the particular ink stick feed channel melts, the push block 34 or gravity or other driving mechanism moves the following ink sticks along the length of the ink stick feed channel, toward the melt plate. In certain circumstances, such as prior to beginning a large print job, the operator may wish to replenish the quantity of solid ink sticks in the feed channel ("top off" the ink supply). The printer operator can insert a new ink stick through the keyed opening 24A, 24B, 24C, 24D into the feed channel 28A, 28B, 28C, 28D only if the last ink stick currently in the feed channel is clear of the keyed opening. The operator has greater flexibility to insert additional ink sticks if the ink sticks have a shorter longitudinal length relative to their width. The ink stick aspect ratio described provides greater solid ink density per unit length of the feed channel, and provides an enhanced ability to fill the feed channel as closely to the keyed opening 24A, 24B, 24C, 24D as possible.

In addition, an ink stick body with a substantially reduced dimension in at least one of the three orthogonal axes may allow more uniform formation of the ink stick body. For example, ink sticks may be formed by inserting molten ink into a mold, and allowing the ink to cool, solidifying as it cools. Such cooling can occur more uniformly when the ink stick body has at least one dimension in the three axes such that the interior mass is closer to an exterior surface, so that it cools more readily.

The ink stick illustrated in FIG. 16 is shown without the keying or other identifying elements described above. However, those skilled in the art will recognize that the keying elements and other features described above can be included in or added to the ink stick shown in FIG. 16.

Figure 17:
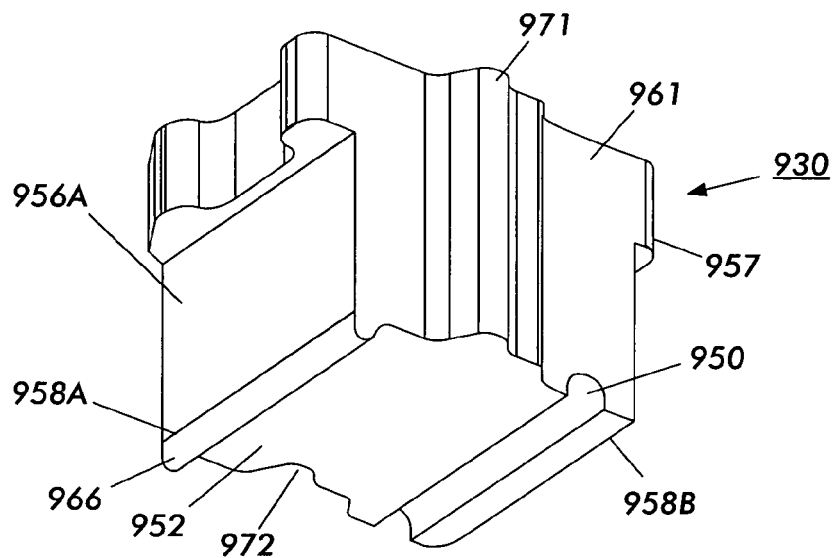
FIG. 17 is a bottom perspective view of another embodiment of a solid ink stick.
Figure 18:
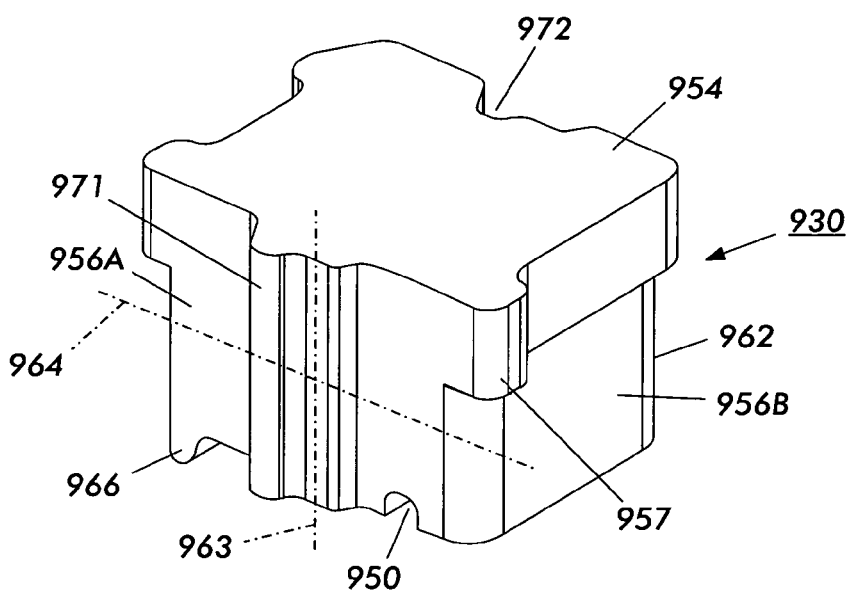
FIG. 18 is a top perspective view of the solid ink stick of FIG. 17.

FIGS. 17 and 18 show an example of a single ink stick incorporating several of the features described and illustrated individually above. FIGS. 17 and 18 show that various features can be combined in different combinations to provide selected benefits for particular ink jet printers.

The ink stick 930 shown in FIGS. 17 and 18 includes a substantially rectangular ink stick body with a bottom surface 952 and a substantially parallel top surface 954. A pair of lateral side surfaces 956A, 956B connect the top surface to the bottom surface. The lateral side surfaces are illustrated with a stepped arrangement. The lower portions of the lateral side surfaces are closer to one another than are the upper portions of the lateral side surfaces, so that the lower portion of the ink stick body is narrower than the upper portion. However, the lateral side surfaces of the ink stick body can be substantially vertical, so that the ink stick body has a substantially uniform horizontal cross section. Alternatively, the lateral side surfaces could slant, giving the ink stick body a tapered shape from top to bottom.

The ink stick body additionally includes a first, or leading end surface 961 and a second, or trailing end surface 962. The leading and trailing end surfaces have complementary non-planar shapes or contours. These contours may be defined by a plurality of straight lines connecting the top surface and the bottom surface along each of the end surfaces of the ink stick body, or by a plurality of curved lines connecting the top and bottom surfaces of the ink stick body. In the example shown, the non-planar contour of the first end surface 961 forms a projecting key or nesting element 971. The non-planar contour of the opposite end surface 962 forms a recessed key or nesting element 972. The complementary shapes 971, 972 nest with one another when two ink sticks are placed adjacent one another with the first end surface of one ink stick abutting the second end surface of an adjacent ink stick in the ink channel. This interaction of the contoured end surfaces of the adjacent ink sticks limits the relative movement of one ink stick with respect to the other. So limiting the relative movement of the ink sticks insures that the ink sticks do not become skewed with respect to each other or with respect to the feed channel as they travel along the length of the feed channel. The illustrated ink stick body includes a protruding nesting element on the leading end surface of the ink stick, and a complementary recessed nesting element on the trailing end surface of the ink stick body. The protruding nesting element may also be on the trailing end surface, with the complementary recessed nesting element on the leading end surface. In addition, the illustrated implementation has the complementary contours extending the entire height of the ink stick body from the top surface to the bottom surface. Alternative embodiments may have the projections and indentations extending only along a portion of the height of the ink stick body end surfaces 961, 962. The projecting and recessed elements 971, 972 on the end surfaces 961, 962 of the ink stick body can also be key elements, as described above in connection with FIGS. 7 and 12–15. Furthermore, in a manner similar to that illustrated above in FIGS. 7 and 12–15, the key elements 971, 972 on both end surfaces of the ink stick may be recesses. Both key elements can also be protrusions from the ink stick body.

The ink stick also includes guide means for guiding the ink stick along the feed channel 28A, 28B, 28C, 28D (see FIG. 4). The ink stick body has a lateral center of gravity 963 between the two lateral side surfaces 956A, 956B, and a vertical center of gravity 964 between the top surface 954 and the bottom surface 952 of the ink stick body. If the weight distribution of the ink stick body is substantially uniform, and the ink stick body is substantially symmetrical about its lateral center, the lateral center of gravity 963 is approximately at the midpoint between the lateral side surfaces of the ink stick body. The ink stick guide means includes a lower guide element 966 formed in the ink stick body, below the vertical center of gravity. The lower guide element 966 interacts with a feed channel guide rail 40 in the feed channel for guiding the ink stick along the feed channel. For example, the lower guide element 966 shown is formed in the bottom surface 952 of the ink stick body as a protrusion from the bottom surface. The lower guide element is laterally offset from the lateral center of gravity 963 of the ink stick body, and may be adjacent one of the lateral sides of the ink stick body. In the illustrated example, the protruding guide element is formed at or near a lateral edge 958A of the bottom surface formed by the intersection of the bottom surface 952 and one of the lateral side surfaces 956A of the ink stick body. The protruding lower guide element can extend along the length of the ink stick body, from the first end surface 961 to the second end surface 962. The lower guide element 966 has a lateral dimension of approximately 0.12 inches (03.0 mm) and protrudes approximately 0.08–0.2 inches (2.0–5.0 mm) from the bottom surface of the ink stick body. The protruding lower guide element tapers from its proximal base, where it joins the main ink stick body, to its distal tip. The distal tip of the lower guide element may be somewhat rounded, or otherwise shaped to complement the guide rail in the lower portion of the ink feed channel. When the ink stick is inserted into a feed channel having an appropriate guide rail 40, the lower guide element 966 of the ink stick slidingly engages the guide rail 40 to guide the ink stick along the feed channel. The protruding lower guide element need not be continuous along the entire length of the ink stick body. In an alternative, the lower guide element can also be recessed into the bottom surface of the ink stick body. The guide rail 40 is raised to function with such a recessed lower guide element. The guide rail 40 and the lower guide element 966 are formed with complementary shapes.

The ink stick body additionally includes an upper guide element 957 that guides a portion of the ink stick body along an upper guide rail 48 in the feed channel and forms an additional portion of the ink stick guide means. The upper guide element 957 of the ink stick is formed above the vertical center of gravity 964 of the ink stick body, on the opposite side of the lateral center of gravity 962 from the lower guide element 966. The upper guide element may be a portion of the lateral side surface of the ink stick body. The lateral side surface 956B containing the upper guide element 957 also intersects the bottom surface 952 of the ink stick body on the lateral edge of the bottom surface opposite the lateral edge nearest the lower guide element 966. The upper edge of the lateral side surface 956B forming the upper guide element 957 corresponds to the bottom surface lateral edge 958B opposite the lateral edge 958A nearest the lower guide element 966.

Referring again to FIG. 4, the upper guide rail 48 of the feed channel may be formed as part of the key plate 26, or may be a part of the feed channel body. The upper guide rail of the feed channel is positioned so that the upper guide element 957 of the ink stick body exerts a small lateral force on the upper guide rail. This lateral force tends to minimize the engagement force between the upper guide element 957 of the ink stick and the upper guide rail 48. The ink stick is guided using only two points of contact—the lower guide element 966 on the lower guide rail 40, and the upper guide element 957 on the upper guide rail 48. This provides greater accuracy in guiding the ink stick along the feed channel, so that the ink stick retains its orientation in the feed channel as the ink stick progresses toward the melt plate 32.

The ink stick 930 illustrated in FIGS. 17 and 18 has the upper portion of the ink stick body, adjacent the top surface 954, formed to provide an outer perimeter that is formed with key elements. The outer perimeter key elements are formed to provide the top surface with a visually recognizable shape, as described above in connection with FIGS. 5–11. The particular ink stick shown has the outer perimeter of the top surface 954 formed in the shape of the numeral "1." A set of ink sticks could include additional ink sticks having top surface outer perimeters in the shapes of the numerals "2," "3," and "4."

In addition, a feed keying element 950 is provided in one of the surfaces of the ink stick body. The feed keying element 950 permits the ink stick to pass a correspondingly shaped key 49 (FIGS. 3 and 4) in the feed channel as the ink stick 930 travels along the length of the feed channel. In the illustrated embodiment, the feed channel key 49 is a projection from the floor 46 or support rib of the feed channel, and the feed keying element in the ink stick body is a longitudinal recess formed in the bottom surface 952 of the ink stick body. However, the feed keying element may also be formed in one of the side surfaces 956, or in the substantially horizontal top surface 954 of the ink stick body. Also, feed keys of different sizes, shapes, and positions can be used in different feed channels of a single printer to provide enhanced protection against an ink stick of the incorrect color reaching the melt plate 32. Feed keys can also be used to differentiate ink sticks intended for different models of printers. One type of feed key can be placed in all the feed channels of a particular model printer. Ink sticks intended for that model printer contain a corresponding feed key element. A feed key of a different size, shape, or position is placed in all feed channels of a different model printer. The different key blocks ink sticks having a feed key element for the first model printer, while permitting ink sticks having a feed key element corresponding to the second feed key to pass.

Those skilled in the art will recognize that corners and edges may have radii or other non-sharp configurations, depending on various factors, including manufacturing considerations. The above description of the ink stick 930 demonstrates that the particular individual features described above and shown in the various implementations illustrated can be combined in a wide variety of combinations and arrangements to meet the particular needs of particular environments. The above descriptions of the various embodiments and the accompanying figures illustrate particular implementations of the ideas and concepts embodied. After studying the above descriptions and accompanying figures, those skilled in the art will recognize a number of modifications can be made. For example, a variety of shapes are possible for the various key elements, the visually recognizable shapes, and the core ink stick body itself. Therefore, the following claims are not to be limited to the specific implementations described and illustrated above.

We claim:

1. An ink stick for use in a solid ink feed system of a phase change ink jet printer, wherein the ink feed system comprises a feed channel having a feed direction and an insertion opening permitting insertion of an ink stick in an insertion direction, different from the feed direction, into the feed channel, the ink stick comprising:
   an ink stick body adapted to be inserted in the insertion direction into the feed channel, the ink stick body having an ink stick insertion perimeter in a plane substantially perpendicular to the insertion direction;
   wherein the ink stick insertion perimeter includes two substantially parallel lateral perimeter segments;
   wherein the ink stick insertion perimeter includes at least one end perimeter segment;
   wherein the end perimeter segment is oriented at an angle with respect to the lateral perimeter segments;
   wherein the end perimeter segment forms a leading portion of the ink stick as the ink stick moves in the feed direction along the feed channel;
   wherein the ink stick insertion perimeter includes at least three nonlinear key elements;
   wherein a first of the nonlinear key elements is on a first one of the lateral perimeter segments of the ink stick insertion perimeter;
   wherein a second of the nonlinear key elements is on a second one of the lateral perimeter segments of the ink stick insertion perimeter;
   wherein a third of the nonlinear key elements is on the end perimeter segment of the ink stick insertion perimeter; and
   wherein the third nonlinear key element has a shape substantially identical to the shape of a portion of the insertion opening.

2. The ink stick of claim 1, wherein as the ink stick is inserted in the insertion direction, the end perimeter segment is at least partially transverse to the feed direction.

3. The ink stick of claim 1, wherein:
   the lateral perimeter segments are substantially linear apart from the nonlinear key elements; and
   the end perimeter segment is substantially linear apart from the nonlinear key element.

4. The ink stick of claim 1, wherein the first and third nonlinear key elements do not intersect one another.

5. The ink stick of claim 4, wherein the second and third nonlinear key elements do not intersect one another.

6. The ink stick of claim 1, wherein the shapes of the first, second, and third nonlinear key elements are substantially identical to shaped elements of the insertion opening.

7. The ink stick of claim 6, wherein the ink stick insertion perimeter shape substantially matches an insertion opening perimeter shape.

8. A solid ink feed system for a printer, the feed system comprising:
   a longitudinal feed channel having an insertion end, a melt end, and a feed direction from the insertion end toward the melt end;
   an insertion key plate having a key plate opening through it to provide access in an insertion direction to the insertion end of the feed channel;
   wherein the insertion direction is different from the feed direction;
   wherein the key plate opening has an insertion opening perimeter;
   wherein the insertion opening perimeter includes two lateral opening perimeter segments and a transverse opening perimeter segment;

wherein the transverse opening perimeter segment intersects at least one of the lateral opening perimeter segments at an angle other than 180°;

wherein the transverse opening perimeter segment is on a portion of the key plate opening toward the melt end of the longitudinal feed channel;

wherein the insertion opening perimeter includes a first nonlinear key element on a first one of the lateral perimeter segments of the ink stick insertion perimeter;

wherein the insertion opening perimeter includes a second of the nonlinear key elements on a second one of the lateral perimeter segments of the ink stick insertion perimeter; and wherein the insertion opening perimeter includes a third nonlinear key element on the transverse perimeter segment of the ink stick insertion perimeter.

9. The solid ink feed system of claim 8, wherein:

the lateral opening perimeter segments are substantially parallel one another; and the transverse opening perimeter, segment is substantially perpendicular to the lateral opening perimeter segments.

10. The solid ink feed system of claim 9, wherein:

the insertion opening perimeter includes a second transverse perimeter segment;

the second transverse perimeter segment is substantially parallel to the first transverse perimeter segment; and the insertion opening perimeter includes a fourth nonlinear key element on the second transverse perimeter segment.

11. The solid ink teed system of claim 8, wherein:

the lateral perimeter segments are substantially linear apart from the nonlinear key elements; and the transverse perimeter segment is substantially linear apart from the nonlinear key element.

12. The solid ink feed system of claim 8, wherein the first and third nonlinear key elements do not intersect one another.

13. The solid ink feed system of claim 12, wherein the second and third nonlinear key elements do not intersect one another.

14. The solid ink feed system of claim 8, additionally comprising an ink stick comprising:

an ink stick body having a perimeter shape with two lateral perimeter segments and a transverse perimeter segment;

first and second nonlinear key elements on the lateral perimeter segments correspond in shape and size to the first and second nonlinear key elements of the insertion opening perimeter; and a third nonlinear key element on the transverse perimeter segment corresponds in shape and size to the third nonlinear key element of the insertion opening perimeter.

15. A method of inserting a solid ink stick into a feed channel of a solid ink printer, the method comprising:

providing an ink stick having an ink stick insertion perimeter;

aligning the ink stick insertion perimeter with an insertion opening of a key plate;

inserting the ink stick in an insertion direction through the insertion opening;

moving the ink stick in a feed direction in the feed channel, wherein the feed direction is different from the insertion direction;

wherein aligning the ink stick insertion perimeter with the insertion opening comprises aligning at least three nonlinear key element shapes of the insertion opening of the key plate; and wherein at least one of the nonlinear key element shapes is oriented at least partially transverse to the feed direction; and wherein moving the ink stick in a feed direction in the feed channel comprises moving the ink stick in the feed direction past the nonlinear key element oriented at least partially transverse to the feed direction.

16. The method of claim 15, wherein at least one of the nonlinear key element shapes is oriented substantially parallel to the feed direction.

* * * * *